United States Patent [19]
Palmer

[11] Patent Number: 5,255,709
[45] Date of Patent: Oct. 26, 1993

[54] FLOW REGULATOR ADAPTABLE FOR USE WITH PROCESS-CHAMBER AIR FILTER

[76] Inventor: David Palmer, 200 Berkeley Rd., North Andover, Mass. 02174

[21] Appl. No.: 852,084

[22] Filed: Mar. 13, 1992

Related U.S. Application Data

[63] Continuation-in-part of Ser. No. 669,746, Mar. 15, 1991, abandoned, which is a continuation-in-part of Ser. No. 405,835, Sep. 11, 1989, Pat. No. 5,000,221, which is a continuation-in-part of Ser. No. 178,505, Apr. 7, 1988, abandoned.

[51] Int. Cl.$^5$ .............................................. G05D 7/01
[52] U.S. Cl. ................................................... 137/501
[58] Field of Search .................. 137/505.25, 500, 501, 137/502, 503, 487.5, 505.38

[56] References Cited

U.S. PATENT DOCUMENTS 3,995,656 12/1976 Mills ........................... 137/505.25 X Primary Examiner—Stephen M. Hepperle
Attorney, Agent, or Firm—Bromberg & Sunstein

[57] ABSTRACT

A device is provided for regulating the flow of fluid from a source and may be used with an air filter of the type found in clean rooms and the like. The device includes an impeder, movably mounted proximate to the input, for variably impeding fluid flowing from the source, and a movably mounted piston having a distal face, exposed to a reference pressure, such as the pressure of the clean room, and a frontal face, exposed to fluid downstream from the impeder. The impeder and the piston are attached to each other, so that an increase in pressure on the distal face of the piston tends to lessen the impedance on the fluid flow, and an increase in pressure on the frontal face of the piston tends to increase the impedance on the fluid flow. A force is exerted on the impeder and the piston so as to tend to cause the impeder to lessen the impedance on the fluid flow; this force may be the weight of the impeder and the piston, as well as any member that connects them.

38 Claims, 5 Drawing Sheets

FLOW REGULATOR ADAPTABLE FOR USE WITH PROCESS-CHAMBER AIR FILTER

This application is a continuation-in-part of application Ser. No. 07/669,746, filed Mar. 15, 1991, now abandoned, which is a continuation-in-part of application Ser. No. 07/405,835 (the "Grandparent Application"), filed Sep. 11, 1989 and issued Mar. 19, 1991 as U.S. Pat. No. 5,000,221, which is a continuation-in-part of application Ser. No. 07/178,505, filed Apr. 7, 1988, now abandoned. Filed concurrently herewith are three applications for Flow Regulator Adaptable For Use With Exhaust From A Process Chamber, Process-Chamber Flow Control System and Flow Control Valve With Venturi by the same inventor as the present invention and bearing U.S. Ser. Nos. 850,767, 851,017, and 851,016; respectively. All these applications are hereby incorporated herein by reference.

TECHNICAL FIELD

This invention generally relates to a device for regulating the flow of a fluid, in particular a gas, through the device.

BACKGROUND ART

In a heating, ventilating, and air conditioning (HVAC) system, air flow is typically controlled using resistors to slow down the flow of air at different points to obtain the proper air balance throughout a building. These resistors may be comprised of gate valves, butterfly valves or dampers, and may be fixed, adjustable or motorized. When one resistor is adjusted, the pressure level throughout the HVAC system will change; any change in the HVAC system pressure will affect the flow of air past every other resistor. Thus, adjusting a resistor at the output causes "cross-talk." Previous attempts to solve the problem of air flow control have automated the resistors using microprocessors and servo-motors.

Municipal gas companies in the United States distribute gas through a network that is terminated with pressure regulators. In these gas distribution systems the pressure at the point of use is fairly independent of pressure changes throughout the distribution network. This can be accomplished because the distribution network is designed to withstand large pressures, and a large pressure drop can be caused at the point of use.

The approach, taken by gas companies, of providing a pressure regulator at the point of use has not been practical for the HVAC industry, because the HVAC industry moves very large quantities of air at very low pressure, and because the HVAC industry is usually more interested in controlling mass flow, not pressure. The comfort of the environment is determined by the thermal mass of hot and cold air that is moved.

Safety valves used in the gas industry, and in other fields involving the handling of fluids under high pressure, open or close only in extreme situations where a large rise or drop in pressure poses a danger. (Gas companies have safety valves that shut off the flow of gas when there is a large decrease in pressure, since such a decrease may be due to a leak downstream of the valve. Many safety valves vent fluid from a conduit when there is a large increase in pressure in order to prevent the pressure in the conduit from increasing beyond the bursting point of the conduit, or beyond the capability of machinery connected to the conduit.) Other valves such as those used in gasoline pumps, also shut off flow automatically when the backpressure increases to a certain point, indicating that the tank being filled is full. These safety valves and gasoline-pump valves are designed to be either fully opened or fully closed, and are not designed to precisely regulate the fluid flow.

One of the most complex problems confronted by the HVAC industry is controlling clean rooms. Clean room requirements dictate that the environment be kept at a constant temperature and humidity (typically within a few degrees and a few percent), that the mass flow into the environment be kept constant, and that the flow be distributed evenly across a ceiling. Clean room ceilings are constructed with special filters designed to remove very small particles from the air entering the room. In addition to being clean, the air leaving the filter should be at an exact velocity. The ceilings are designed to disperse the air into the clean room at the same velocity over the entire surface of the ceiling. The ceilings and filters are constructed to add as little resistance to the air flow as possible, and so that there is only little variation from one filter to the next.

In order to deliver the same mass flow to each filter, the HVAC industry uses a network of resistors deployed throughout the air delivery system. The air flow through each filter is controlled by adding or removing resistance. In a single clean room the ceiling may contain as many as 150 filters. A process called balancing is used to adjust the filter flow rates. The resistors are repeatedly adjusted in sequence, until the flow rate is within the specified range, or until the amount of time the clean room is down, during the balancing process, gets too expensive. After the balancing is completed, the whole network is still subject to changes in the supply pressure and the demand requirements of the clean room.

DISCLOSURE OF INVENTION

The present invention solves the problems found in the prior art systems by providing a self-regulating flow control system. Compared to many of the prior art systems, the present invention in not complex and uses few moving parts.

In one embodiment, a fluid, typically air, a gas or a mixture of gasses, flows through a device from a source to an environment—the source being at a higher pressure than the environment. This device includes a gate, movably mounted proximate to the input to the device, through which fluid from the source passes. The gate variably impedes fluid flowing through the input. Connected to the gate is a movably mounted piston having a distal face, exposed to a reference pressure, and a frontal face, exposed to fluid downstream from the gate. In a preferred embodiment the reference pressure is the pressure of the environment. The piston and the gate are mounted so that an increase in pressure on the distal face of the piston tends to lessen the gate's impedance on the fluid flow, and an increase in pressure on the frontal face of the piston tends to increase the gate's impedance on the fluid flow. In a preferred embodiment, the piston and the gate are mounted so as to move in a direction transverse to the direction of fluid flowing past the gate means. In addition to the forces caused by the fluid pressure on the frontal and distal faces, a restoring force is applied to the piston so as to tend to cause the gate to lessen the impedance on the fluid flow. It is preferred that this restoring force include the weight of the piston and the gate.

The device may also include another flow resistor (such as a filter), located downstream of the gate, for further impeding the flow of fluid. This flow resistor may be variable. The fluid between the gate and the flow resistor is exposed to the frontal face of the piston.

The piston may have an aperture disposed therein, through which fluid flowing from the input passes. A deflector, fixedly mounted adjacent to the input, may be used for directing the fluid flowing through the aperture radially, past the gate and the frontal face of the piston. In such an embodiment, the gate may be made of an annulus mounted about the deflector, the annulus being rigidly attached to the piston.

DESCRIPTION OF SPECIFIC EMBODIMENTS

Figure 1:
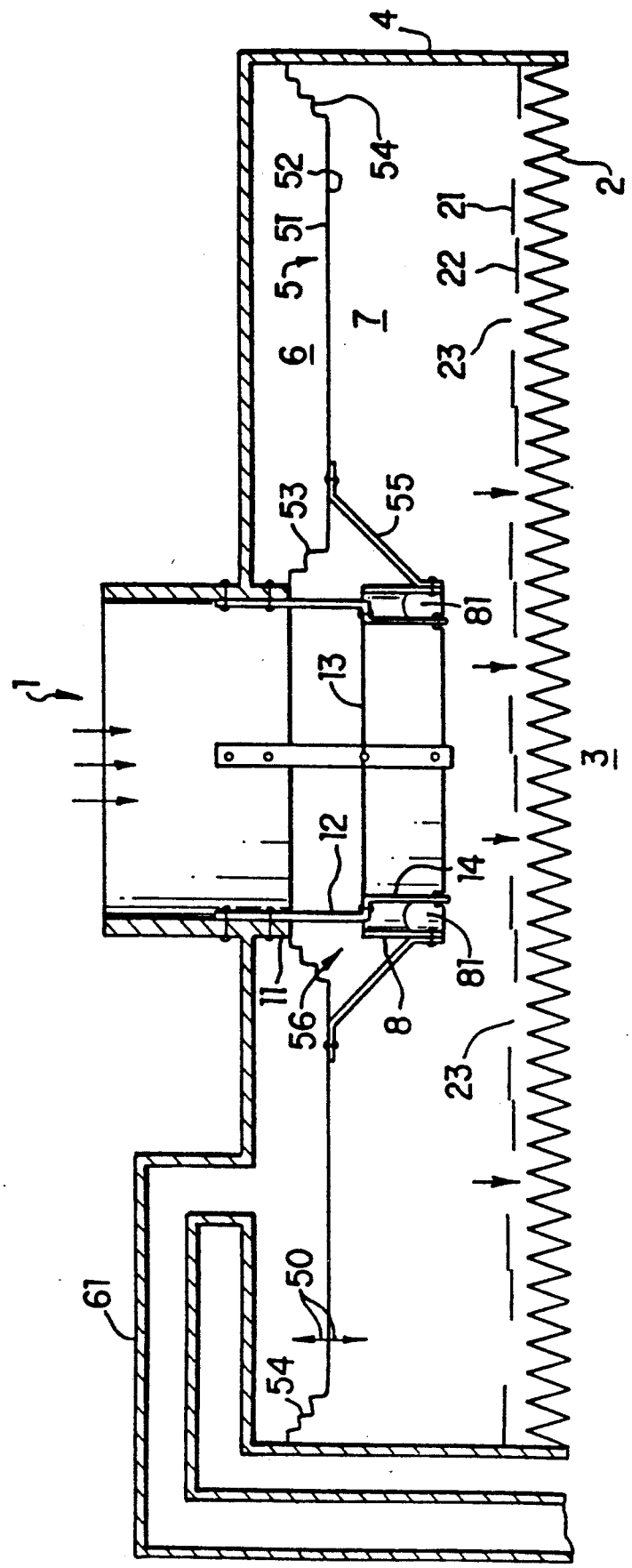
FIGS. 1, 2 and 3 show embodiments of the invention that regulate the flow of fluid from a source to an environment, such as a process chamber.

FIG. 1 shows one embodiment of the invention, wherein air flowing from a source, which provides air at a relatively high pressure, through an input 1 and a pleated filter 2 into an environment 3 (e.g., a clean room environment). The housing 4 is divided into two chambers, a chamber 6 and a plenum 7. The chamber 6 is at a reference pressure, and may be vented (by means of a tube 61 for example) to the clean room 3, so that the reference pressure in the chamber 6 is the same as the pressure of the clean room 3. The plenum 7 and the chamber 6 are separated by a movably mounted piston 5. One face of the piston 5, the frontal face 52, is exposed to the air in the plenum 7. The other face, the distal face 51 is exposed to the reference pressure in the chamber 6. The piston 5 may move in the directions indicated by the arrows 50. The piston 5 has a aperture 56 in its center. Air flowing from the input 1 passes through this aperture 56. The inner edge of the piston 5 is connected to the valve seat 11 by a membrane 53. The outer edge of the piston 5 may be connected to the housing 4 by a membrane 54. A deflector 13 may be connected to the valve seat 11 by struts 12. The deflector 13 redirects the flow of air from a direction that is parallel to the direction that the piston 5 may move, into axial directions that are transverse to the direction of movement of the piston 5. Connected to the piston 5 by struts 55 is an annular gate 8, which is located around the deflector 13 and which moves with the piston 5. In the preferred embodiment, the deflector 13 does not move. Rolling springs 81 may connect the gate 8 to struts 14 mounted on the bottom of the deflector 13. Although they are not necessary, the rolling springs 81 can provide lateral stability to the piston 5 and help smooth the vertical motion of the piston 5. As the gate 8 moves with the piston 5, it variably restricts the flow of air through the device.

Air flowing through this device passes from the input 1, then is redirected by the deflector 13 past the gate 8, through the plenum 7, and then passes through the filter 2 into the clean room 3. How much the gate 8 impedes the air flow depends on the piston's 5 position, which in turn depends on the pressure difference between the plenum 7 and the chamber 6, and any other force working on the piston 5. In the device shown in FIG. 1, the other force is the combined weight of the piston 5, the gate 8 and the struts 55 connecting the two. This weight tends to open up the gate 8 and thereby lower the impedance to the flow that the gate causes. When the pressure in the plenum 7 becomes sufficiently greater than the pressure in the chamber 6, the piston 5 and the gate 8 rise, and cause an increase in impedance on the flow by the gate 8. The increase in impedance by the gate 8 lowers the flow rate of the air. The piston 5 and gate 8 will come to a position of equilibrium, so as to cause a constant pressure differential between the plenum 7 and the chamber 6.

Thus, when the venting tube 61 is vented to the environment 3, the pressure in the plenum 7 is constant relative to the pressure in the environment 3. By maintaining a constant pressure drop across the filter 2 the device can maintain a fairly constant mass flow rate.

Without this device a drop in the clean room pressure would tend to cause the mass flow rate to increase, because there is a larger pressure drop between the source and the clean room 3. With the device, a drop in the clean room pressure causes the pressure in the chamber 6 to drop, because the chamber 6 is vented by tube 61 to the clean room. The drop in chamber pressure in turn causes the piston 5 and gate 8 to rise and increase the impedance on the air flow by the gate 8. This increase in impedance counteracts the larger pressure drop between the source and the clean room, so the mass flow rate remains fairly constant. Conversely, an increase in clean room pressure would tend to open up the gate 8 and lower the impedance.

Similarly, without this device an increase in pressure at the source would tend to cause an increase in the mass flow rate. With the device, an increase in pressure at the input 1 causes a momentary increase of pressure in the plenum 7, which in turn causes the piston 5 and gate 8 to move up. The rise in the gate 8 increases the impedance on the flow, thereby counteracting the larger pressure drop between the source and the clean room 3. Conversely, a drop in the input pressure would tend to open up the gate 8 and lower the impedance.

When there is little or no flow through the device, the gate 8 and piston 5 drop to their lowest position and provide the smallest impedance to the flow that the gate 8 can provide. Thus, when there is little or no flow, the device is fully open. The device does not have to be re-set after the flow has stopped. When the flow restarts and increases to a certain amount, the gate 8 and piston 5 rise to increase the impedance to the flow.

The device shown in FIG. 1 shows a preferred embodiment of the invention, wherein the gate is rigidly attached to the piston 5, so that the gate 8 and piston 5 move in unison. The piston and gate may also be attached by other means, such as levers or other types of mechanisms, so that, as the piston 5 rises, the gate 8 increases its impedance on the flow, and, as the piston drops, the gate lessens its impedance on the flow.

The filter 2 provides a constant resistance to the air flowing from the plenum 7 to the environment 3. Additional resistance can be provided by means of grids 21 and 22, which form orifices 23. Grid 21 is movable, so that the size of the orifices 23, and the resistance to flow from the plenum 7 to the environment 3, may be varied. The pressure in the plenum 7 relative to the environment 3 can be controlled by moving grid 21. The sliding of the movable grid 21 can be done manually or by a servo-control. The orifices 23 may be of different sizes depending on their position within the device in order to disperse the air evenly through the filter.

Figure 2:
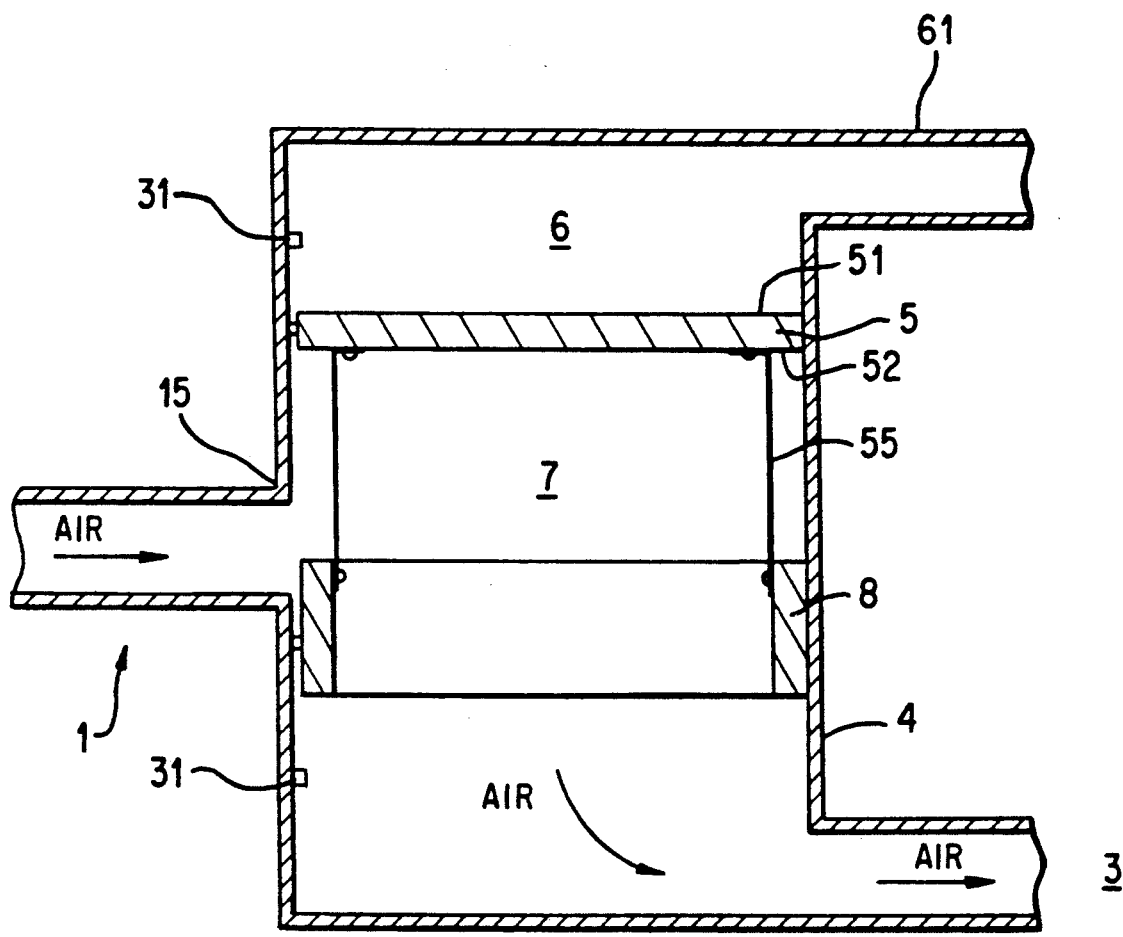

FIG. 2 shows an alternative embodiment of the invention. In this embodiment the piston 5 does not have an aperture. The piston 5 and the gate 8 are rigidly connected by struts 55, so they move in unison. The fluid passes through the input 1 past the gate 8 at a constriction point 15. The piston 5 should fit snugly in the housing 4 so that fluid may not pass between the housing 4 and the piston 5 into the reference chamber 6. The fit, however, should not be too tight so as to create an undue amount of friction between the piston 5 and the housing 4. A flexible membrane, such as rolling diaphragm, may be attached between the piston 5 and the housing 4.

Just as in the embodiment shown in FIG. 1, how much the gate 8 impedes the flow of fluid depends on the position of the piston 5, which in turn depends on the balance of forces exerted by the pressure differential between the reference chamber 5 and the plenum 7, and the combined weight of the piston 5, the gate 8 and the struts 55 connecting them.

Figure 3:
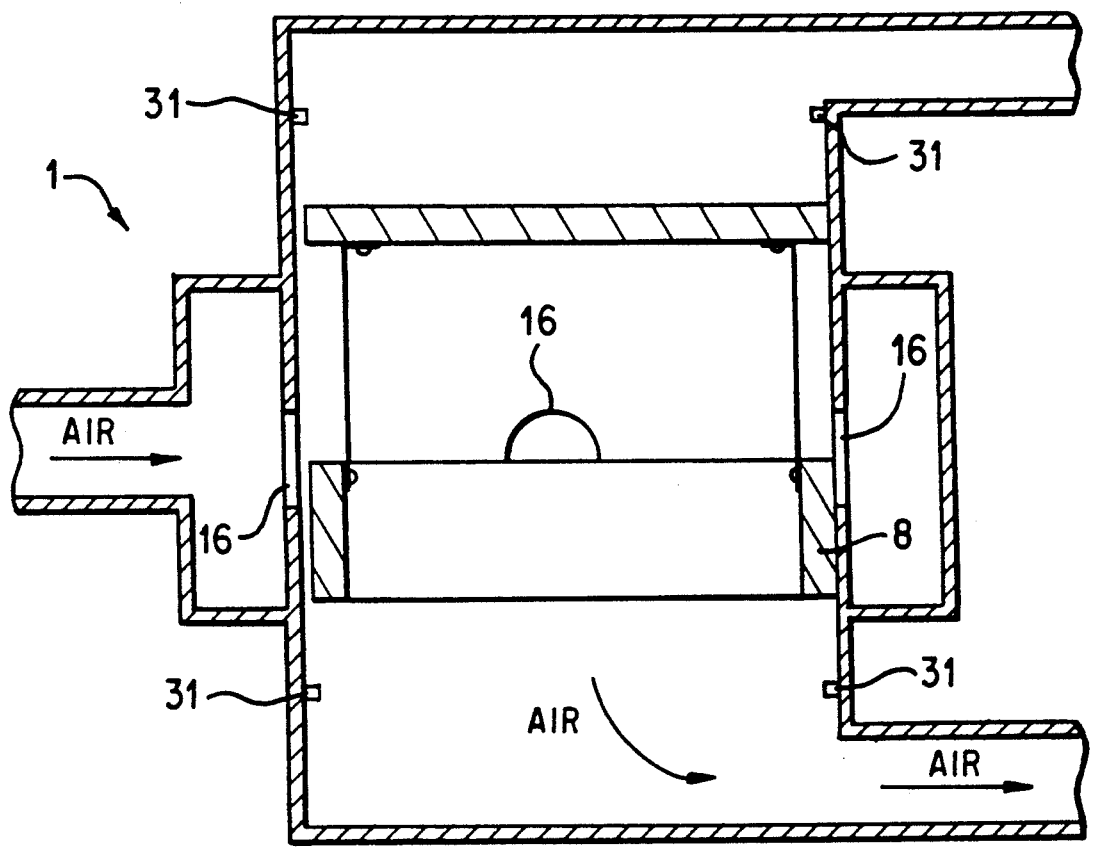

A disadvantage of the device shown in FIG. 2 is that the fluid flowing from the input 1 tends to push the gate 8 and piston 5 to the right against the wall of the housing 4. This increases the friction between the piston/gate structure and the housing 4. FIG. 3 shows an embodiment that does not have this disadvantage. Several input ports 16 are provided, and they are disposed around the housing 4, so that the fluid passing through the input ports 16 passes the gate 8 on several sides By dispersing the flow through several ports 16, the gate 8 and the piston 5 need not be forced against the walls of the housing 4.

Figure 4:
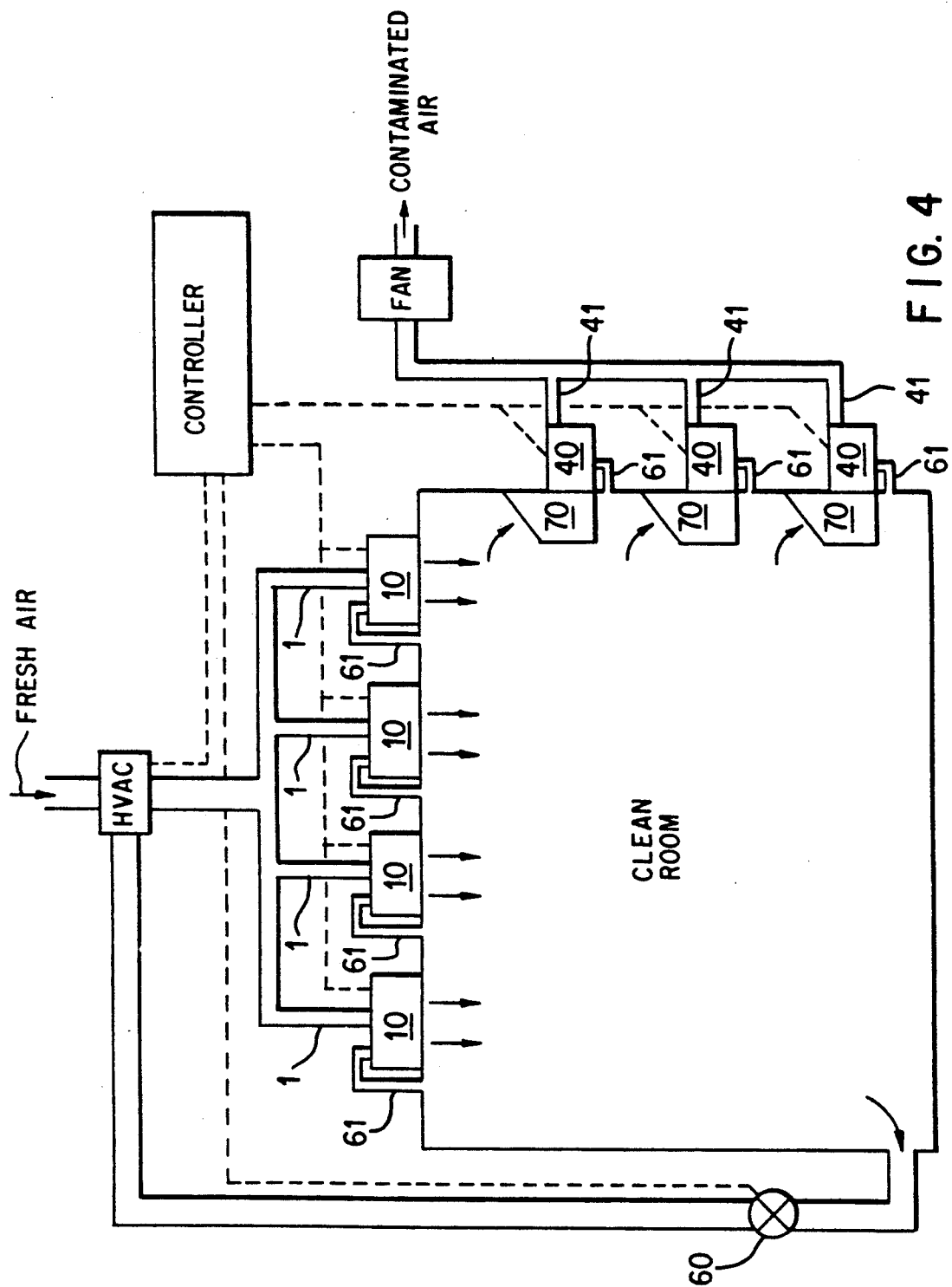
FIG. 4 shows how the flow through a clean room may be controlled.

FIG. 4 shows how the flow through a clean room may be controlled. Air from a HVAC system enters the inputs 1 of several flow regulators 10 of the type shown in FIG. 1. Each of these regulators 10 uses the pressure of the clean room as the reference pressure by connecting the reference pressure tubes 61 to the clean room. Each of these flow regulators 10 maintains a constant mass flow rate as long as the HVAC system maintains sufficient pressure at the inputs 1. Because the regulators 10 can maintain a constant flow rate despite variations in the input pressure, the flow rate of a given regulator 10 does not vary when other flow regulators are removed or added to the system. Thus, cross-talk between the regulators 10 is avoided. A controller may be used to control the flow rates through the regulators 10 by adjusting the movable grid (item 21 in FIG. 1).

Contaminated air from process equipment 70 is evacuated from the clean room. The mass flow rate of the contaminated air from the equipment 70 may be controlled by regulators 40, such as those shown in FIGS. 1-6 of the concurrently filed application for Flow Regulator Adaptable For Use With Exhaust From A Process Chamber, or the devices shown in FIGS. 4 and 8 of the Parent Application, or the devices shown in FIGS. 5, 6 and 6A of the Grandparent Application (all of which applications are referenced hereinabove). The reference pressure for these regulators 40 may be set to the clean room pressure by connecting the reference chamber 17 to the clean room. These devices 40 are also able to maintain a constant flow rate (assuming that a sufficiently strong vacuum is maintained), even when other devices 40 are added or removed from the system. The controller can vary the flow rates through these devices, by adjusting the gate valve of the device shown in FIG. 1 of the concurrently filed application for Flow Regulator Adaptable For Use With Exhaust From A Process Chamber, or by adjusting the position of the modulator of the device shown in FIG. 6 of the Grandparent Application, or by adjusting the throttle valve of the device shown in FIG. 5 of the Grandparent Application, or by adjusting the slidable mass in the device shown in FIG. 9 of the Grandparent application.

By adjusting valve 60 the controller may also control the pressure of the clean room. The device shown in FIGS. 5 and 6 of the concurrently filed application for Flow Regulator Adaptable For Use With Exhaust From A Process Chamber may be used as valve 60. By placing pressure transducers inside and outside of the clean room, the controller may be used to ensure that the pressure in the clean room is kept higher than atmospheric pressure. This is desired so as to prevent "dirty" air from entering the clean room when doors to the clean room are opened. By placing pressure transducers inside and outside of medical and biotechnology laboratories, the controller may be used to ensure that the pressure in the laboratories is kept lower than atmospheric pressure, so as to prevent potentially dangerous microbes from blowing out of the laboratories. Air may be recirculated back to the clean room by the HVAC system, and the controller may be used to ensure that the stale air is replaced at the proper rate.

Figure 5:
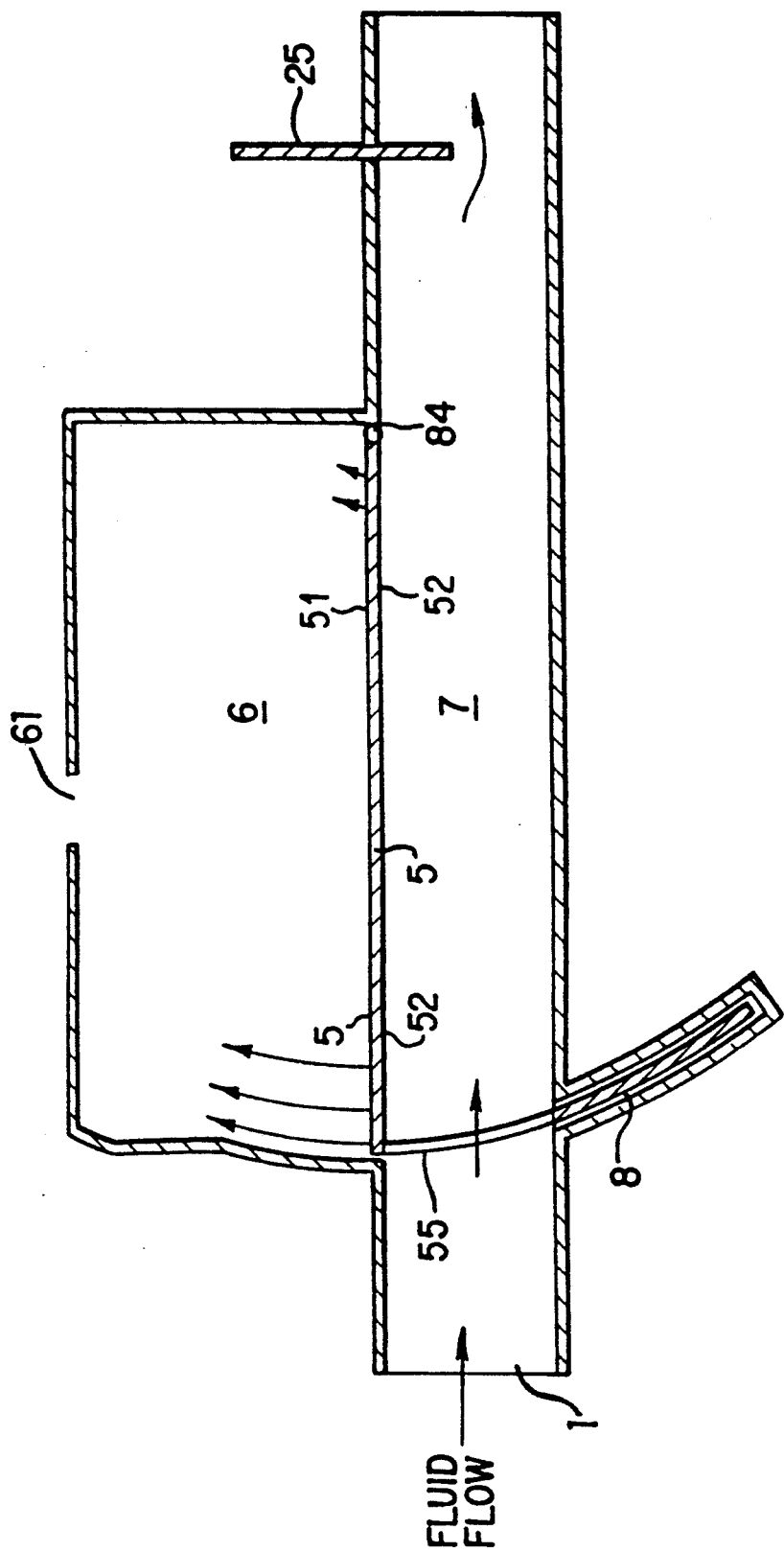
FIG. 5 shows an embodiment of the invention wherein the piston is hingedly mounted.

FIG. 5 shows an embodiment of the invention wherein the piston 5 is hingedly mounted. The piston 5 is connected to the gate 8 by means of struts 55. The piston 5 rotates up and down, so that it and the gate 8 move in a direction that is transverse to the direction of flow. The frontal face 52 of the piston 5 is exposed to fluid flowing through the conduit, and the piston's distal face 6 is exposed to a reference pressure chamber 6, which is preferably in fluid communication through a port 61 with an environment (e.g., a process chamber) downstream of the device. The input 1 of the device is preferably connected to a source of air. Air flows past the struts 55 and the gate 8, and then past the piston 5. Downstream of the piston 5 is a gate valve 25, which may be moved up and down to alter the flow rate. The gate valve 25 in the FIG. 5 device performs the same function as the adjustable grid structure 21 and 22 of the FIG. 1 device. The piston 5 and the gate 8 in the FIG. 5 device are in their lowest position, which is consistent with a low flow rate. When the flow rate increases beyond a certain point (i.e., when the pressure differential between the piston's frontal and distal faces, 52 and 51, overcomes the weight of the piston-strut-gate structure, 5, 55 and 8—other restoring force), the piston 5 pivots upward in the direction indicated by the arrows extending from the piston's distal face 51. The upward movement of the piston 5 causes the gate 8 to move upward to impede the flow. The gate 8 increases the impedance on the flow to counter any further increase in pressure at the input 1. Thus, the device is able to maintain a constant pressure differential between the plenum 7 and the chamber 6, the differential being related to the restoring force exerted on the piston, which in this case is the weight of the piston-strut-gate structure. By setting the pressure in the chamber 6 equal to the pressure downstream of the gate valve 25, a constant pressure drop across the gate valve 25 can be maintained. The position of the gate valve 25 can be adjusted to accurately control the flow rate.

Instead of using the simple gate 8 of the FIG. 5 device to impede fluid flow, the somewhat more complicated airfoil structure of the device shown in FIGS. 5 and 6 of the concurrently file application for Flow Regulator Adaptable For Use With Exhaust From A Process Chamber. The movable portion of each airfoil is connected to the piston 5, and, as the piston rises in response to an increase in plenum 7 pressure relative to the reference chamber 6 pressure, the piston lifts the movable portion of the airfoil to further impede the air flow.

The device shown in FIG. 5, as well as the devices shown in FIGS. 1, 2 and 3, can be combined with the venturi meter shown and described in the concurrently filed application for Flow Control Valve with Venturi, referenced hereinabove. The venturi meter may be placed upstream or downstream of the devices shown in FIGS. 2, 3 and 5 herein, and upstream of the device shown in FIG. 1 herein, in order to measure the flow rate through the devices and to control the position of the gate valve 25 or the grid 21, of the devices shown in FIGS. 5 and 1 respectively.

What is claimed is:

1. A device for regulating the flow of fluid from a source, the device comprising:
   an input, through which fluid from the source passes;
   impedance means, movably mounted proximate to the input, for variably impeding at a constriction point fluid flowing from the source, wherein the impedance means is disposed so that fluid pressures acting directly on the impedance means exert a force on the impedance means substantially perpendicular to the impedance means's direction of movement;
   a movably mounted piston having a distal face, exposed to a reference pressure, and a frontal face, exposed to fluid downstream from the constriction point, wherein the only fluid pressures acting on the piston in the direction of piston movement are the reference pressure and the fluid pressure downstream from the constriction point, the impedance means and the piston being attached to each other, so that an increase in pressure on the distal face of the piston tends to lessen the impedance on the fluid flow, and an increase in pressure on the frontal face of the piston tends to increase the impedance on the fluid flow; and
   restoring means for exerting a force on the piston so as to tend to cause the impedance means to lessen the impedance on the fluid flow.

2. A device according to claim 1, wherein the piston is mounted so as to move in a direction transverse to the direction of fluid flowing through the constriction point.

3. A device according to claim 1, further including resistance means for further impeding the flow of fluid, the resistance means being located downstream of the constriction point such that the fluid between the constriction point and the resistance means is exposed to the frontal face of the piston.

4. A device according to claim 3, wherein the reference pressure is the pressure of fluid downstream of the resistance means.

5. A device according to claim 3, wherein the resistance means includes a filter.

6. A device according to claim 1, further including variable resistance means for variably impeding the flow of fluid, the variable resistance means being located downstream of the constriction point such that the fluid between the constriction point and the variable resistance means is exposed to the frontal face of the piston.

7. A device according to claim 1, wherein the restoring means includes the weight of the piston.

8. A device according to claim 1, wherein the restoring means includes the weight of the piston and the impedance means.

9. A device according to claim 1, wherein the areas of the frontal and distal faces are approximately equal.

10. A device according to claim 1, wherein the piston has an aperture disposed therein, and the piston is mounted such that fluid flowing from the input passes through the aperture;
    the device further including a deflector, mounted adjacent to the input, for deflecting the fluid flowing through the aperture radially past the frontal face of the piston; and
    wherein the impedance means includes an annulus mounted about the deflector, the annulus being rigidly attached to the piston.

11. A device according to claim 1, wherein the impedance means and the piston are arranged with respect to each other and the input so that the fluid passes between the impedance means and the piston.

12. A device for regulating the flow of fluid from a source, the device comprising:
    an input, through which fluid from the source passes;
    impedance means, movably mounted proximate to the input, for variably impeding fluid flowing from the source;
    a movably mounted piston having a distal face, exposed to a reference pressure, and a frontal face, exposed to fluid downstream from the impedance means, the impedance means and the piston being attached to each other, so that an increase in pressure on the distal face of the piston tends to lessen the impedance on the fluid flow, and an increase in pressure on the frontal face of the piston tends to increase the impedance on the fluid flow,
    wherein the piston has an aperture disposed therein, and the piston is mounted such that fluid flowing from the input passes through the aperture;
    restoring means for exerting a force on the piston so as to tend to cause the impedance means to lessen the impedance on the fluid flow; and
    a deflector, mounted adjacent to the input, for deflecting the fluid flowing through the aperture radially past the frontal face of the piston,
    wherein the impedance means includes an annulus mounted about the deflector, the annulus being rigidly attached to the piston.

13. A device according to claim 12, wherein the impedance means and the piston are arranged with respect to each other and the input so that the fluid passes between the impedance means and the piston.

14. A device according to claim 12, wherein the piston is mounted so as to move in a direction transverse to the direction of fluid flowing past the impedance means.

15. A device according to claim 12, further including resistance means for further impeding the flow of fluid, the resistance means being located downstream of the impedance means such that the fluid between the impedance means and the resistance means is exposed to the frontal face of the piston.

16. A device according to claim 15, wherein the reference pressure is the pressure of fluid downstream of the resistance means.

17. A device according to claim 12, further including variable resistance means for variably impeding the flow of fluid, the variable resistance means being located downstream of the impedance means such that the fluid between the impedance means and the variable resistance means is exposed to the frontal face of the piston.

18. A device according to claim 12, wherein the restoring means includes the weight of the piston.

19. A device according to claim 12, wherein the restoring means includes the weight of the piston and the impedance means.

20. A device according to claim 12, wherein the areas of the frontal and distal faces are approximately equal.

21. A device for regulating the flow of fluid from a source to an environment, wherein the fluid is substantially still, the source having a higher pressure than the environment, the device comprising:
   a plenum having an input, through which the plenum is in communication with the source, and an output, through which the plenum is in communication with the environment;
   a movably mounted piston having a frontal face, exposed to the plenum, and a distal face exposed to the environment's pressure;
   impedance means, movably mounted proximate to the input, for variably impeding at a constriction point fluid flowing from the source, the impedance means and the piston being attached to each other, so that an increase in pressure on the distal face of the piston tends to lessen the impedance on the fluid flow, and an increase in pressure on the frontal face of the piston tends to increase the impedance on the fluid flow, wherein the impedance means is disposed such that fluid pressures acting directly on the impedance means exert a force on the impedance means substantially perpendicular to the impedance means's direction of movement; and
   restoring means for exerting a force on the piston so as to tend to cause the impedance on the fluid flow.

22. A device according to claim 21, further including a filter mounted in the output.

23. A device according to claim 21, wherein the piston and the impedance means are rigidly attached to each other and move in a direction transverse to the flow of fluid through the constriction point, and the restoring force includes the weight of the piston and the impedance means.

24. A device for regulating the flow of fluid from a source, the device comprising:
   a plenum having an input, through which the plenum is in communication with the source;
   a gate, movably mounted proximate to the input, for variably impeding at a constriction point, fluid flowing from the source, wherein the gate is disposed so that fluid pressures acting directly on the gate exert a force on the gate substantially perpendicular to the gate's direction of movement;
   a movably mounted piston, the piston having a distal face, exposed to a reference pressure, and a frontal face at the opposite end of the piston from the distal face, the frontal face being exposed to fluid downstream from the constriction point, the piston being disposed so that fluid does not flow between the frontal and distal faces;
   strut means, located entirely in the plenum, for attaching the gate and the piston to each other, so that an increase in pressure on the distal face of the piston tends to lessen the impedance on the fluid flow, and an increase in pressure on the frontal face of the piston tends to increase the impedance on the fluid flow; and
   restoring means for exerting a force on the piston so as to tend to cause the gate to lessen the impedance on the fluid flow.

25. A device according to claim 24, further including resistance means for further impeding the flow of fluid, the resistance means being located downstream of the constriction point, such that the fluid between the constriction point and the resistance means is exposed to the frontal face of the piston.

26. A device according to claim 24, further including variable resistance means for variably impeding the flow of fluid, the variable resistance means being located downstream of the constriction point, such that the fluid between the constriction point and the variable resistance means is exposed to the frontal face of the piston.

27. A device according to claim 24, wherein the piston has an aperture disposed therein, and the piston is mounted such that fluid flowing from the input passes through the aperture;
   the device further including a deflector, mounted adjacent to the input, for deflecting the fluid flowing through the aperture radially past the frontal face of the piston, and
   wherein the gate includes an annulus mounted about the deflector.

28. A device according to claim 24, wherein the gate and the piston are arranged with respect to each other and the input so that the fluid passes between the gate and the piston.

29. A device according to claim 24, wherein the piston and gate are disposed so that an increase in pressure on the distal face of the piston tends to lessen the impedance on substantially all the fluid flowing through the device, and an increase in pressure on the frontal face of the piston tends to increase the impedance on substantially all the fluid flowing through the device.

30. A device for regulating the flow of fluid from a source to an environment, where the fluid is substantially still, the source having a higher pressure than the environment, the device comprising:
   an input, through which fluid from the source passes;
   a gate, movably mounted proximate to the input, for variably impeding at a constriction point fluid flowing from the source, wherein the gate's dimension in the direction of fluid flow through the constriction point is small with respect the gate's other dimensions;
   a movably mounted piston, the piston having a distal face, exposed to the pressure of the environment, and a frontal face at the opposite end of the piston from the distal face, the frontal face being exposed to fluid downstream from the constriction point, the piston being disposed so that fluid does not flow between the frontal and distal faces;
   strut means for attaching the gate and the piston to each other, so that an increase in pressure on the distal face of the piston tends to lessen the impedance on the fluid flow, and an increase in pressure on the frontal face of the piston tends to increase the impedance on the fluid flow; and restoring means for exerting a force on the piston so as to tend to cause the gate to lessen the impedance on the fluid flow.

31. A device according to claim 30, wherein the gate and the piston are arranged with respect to each other and the input so that the fluid passes between the gate and the piston.

32. A device according to claim 30, wherein the piston and gate are disposed so that an increase in pressure on the distal face of the piston tends to lessen the impedance on substantially all the fluid flowing through the device, and an increase in pressure on the frontal face of the piston tends to increase the impedance on substantially all the fluid flowing through the device.

33. A device according to claim 30, wherein the piston moves in a direction perpendicular to the flow of fluid through the constriction point, and the piston's dimension in the direction of its movement is small with respect the piston's other dimensions.

34. A device for regulating the flow of fluid from a source, the device comprising:
an input, through which fluid from the source passes;
impedance means, movably mounted proximate to the input, for variably impeding fluid flowing from the source;
a movably mounted piston having a distal face, exposed to a reference pressure, and a frontal face, exposed to fluid downstream from the impedance means, the impedance means and the piston being attached to each other, so that an increase in pressure on the distal face of the piston tends to lessen the impedance on substantially all the fluid flowing through the device, and an increase in pressure on the frontal face of the piston tends to increase the impedance on substantially all the fluid flowing through the device; and
restoring means for exerting a force on the piston so as to tend to lessen the impedance on the fluid flow.

35. A device according to claim 34, wherein the piston is pivotally mounted.

36. A device according to claim 34, wherein the reference pressure is the pressure of an environment, to which the fluid flows from the device, and where the fluid is substantially still.

37. A device according to claim 34, wherein the impedance means includes an annulus, rigidly attached to the piston, so that fluid passes between the annulus and the piston.

38. A device for regulating the flow of fluid from a source, the device comprising:
impedance means, movably mounted, for variably impeding at a constriction point fluid flowing from the source, the impedance means is disposed so that fluid pressures acting directly on the impedance means exert a force on the impedance means substantially perpendicular to the impedance means's direction of movement;
a movably mounted piston having a distal face, exposed to a reference pressure, and a frontal face, exposed to fluid downstream from the constriction point, the piston being disposed so that fluid flowing through the constriction point flows between the piston and the impedance means;
deflector means, fixedly mounted adjacent the impedance means, for directing the fluid to the constriction point, the deflector means being disposed so that the fluid flowing through the constriction point flows between the piston and the deflector means;
strut means for attaching the impedance means and the piston to each other, so that an increase in pressure on the distal face of the piston tends to move impedance means closer to the deflector means so as to lessen the impedance on the fluid flow, and an increase in pressure on the frontal face of the piston tends to move impedance means further from the deflector means so as to increase the impedance on the fluid flow; and
restoring means for exerting a force on the piston so as to tend to lessen the impedance on the fluid flow.

* * * * *